June 20, 1933.  W. A. WALTHERS  1,915,208
FISHING DEVICE
Filed April 25, 1932
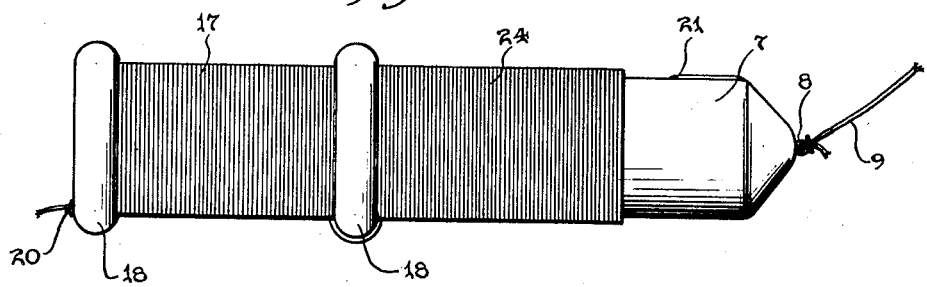
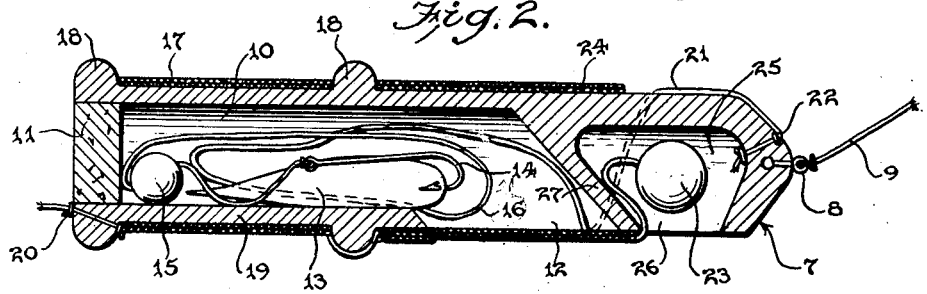
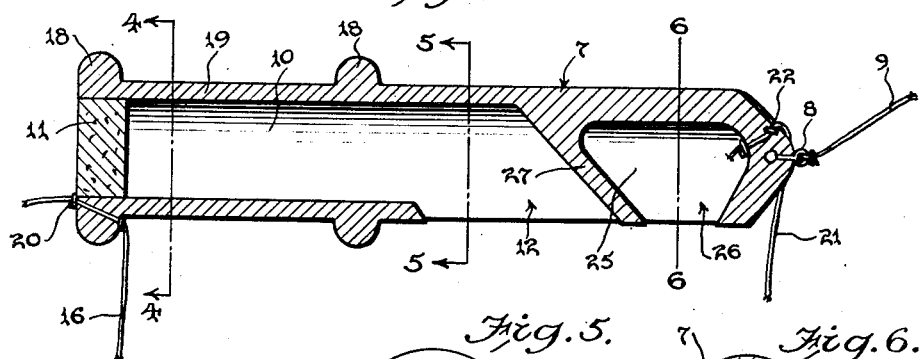
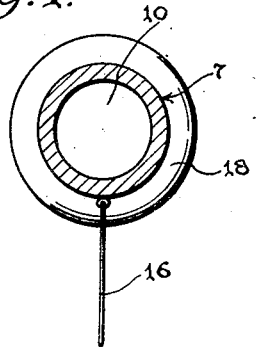 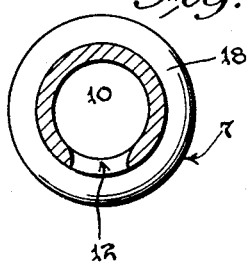 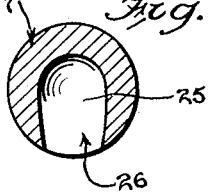
Inventor
W. A. Walthers,
By Seymour & Bright
Attorneys Patented June 20, 1933

1,915,208

UNITED STATES PATENT OFFICE

WILLIAM A. WALTHERS, OF DALTON, WISCONSIN

FISHING DEVICE

Application filed April 25, 1932. Serial No. 607,396.

This invention relates to improvements in fishing devices, and more especially to a self anchoring bait protecting casting float.

One of the objects of the invention is to provide a fishing device to enable the fisherman to place the bait at a selected place in the water and to keep it there until the same is seized by a fish.

Another object is to furnish a bait protecting casting float which will prevent losing or damaging of the bait while casting or throwing the float.

Another object is to supply a device of this kind, including an anchor line which will prevent wind, waves or moving water from moving the bait out of a desired position, and will also prevent the casting line from floating the bait back to the shore or boat, and thus avoid much line tangling caused by minnows swimming in a circle.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a side elevation of the improved self-anchoring bait protecting casting float with the anchor line and bait line wound thereon.

Fig. 2 is a longitudinal vertical sectional view of the same.

Fig. 3 is a view similar to Fig. 2, after the contents of the casting float has been discharged and the bait and anchor lines have been unwound.

Figs. 4, 5 and 6 are transverse sectional views taken respectively on the lines 4—4, 5—5 and 6—6 of Fig. 3.

Referring to the drawing, 7 designates a substantially tubular float or casing made of any suitable material such as water-proof wood. One end of the float is connected by a swivel connection 8 to a casting line 9 which leads to the usual reel on the fishing rod, not shown.

A chamber 10 in the float has one of its ends closed by a movable plug 11 which is frictionally held in place and may be shifted along the chamber for altering the size of the latter. This chamber has a mouth 12 opening through one side of the float, and it is designed to contain a live minnow or bait 13, a hook or hooks 14, and a sinker 15, all of which are attached to one end portion of a bait line 21. This line can be wound about the float, as shown at 17, between flanges 18, which, with the float, form a spool or reel 19. The other end of the bait line is secured to the float, as shown at 22.

An anchor line 16 has one of its ends secured to the float, as at 20, and its other end is secured to an anchor 23. The anchor line is adapted to be wound about a portion of the float, as shown at 24, to substantially close the mouth 12 of the chamber 10, after the minnow or bait 13, hook 14 and sinker 15 have been placed in the chamber 10.

The float has a second chamber 25, provided with a restricted mouth 26 opening through the same side of the float as the mouth 12, and there is a partition wall 27 in the float between the two chambers, and this wall is inclined toward the mouth 26 and away from the mouth 12 for the purpose of maintaining the anchor 23 in the float during casting, and to assist in discharging the elements 13, 14 and 15 from the float after the anchor line 24 has been unwound.

In using the device, the minnow, hook and bait sinker 15 will be dropped into the chamber 10 after the line 21 has been wound on the spool 19. Then the anchor line 16, 24 will be wound on the float in such manner as to close the mouth 12 of the chamber 10 to prevent discharge of the elements 13, 14 and 15 during casting, and at the same time permit air to pass through said mouth 12 into the chamber 10. When the winding of the anchor line has been completed, the anchor 23 is inserted in the chamber 25. Now, if the device is cast to a desired spot on the water, as soon as the float arrives at this spot, the anchor 23 will drop out of the chamber 25 and in descending, will unwind the line 16, 24 until the anchor 23 reaches bottom. Then the fisherman, by means of the line 9, will pull the float toward him to complete the unwinding of the anchor line and to bring the float over the spot where it is desired to release the bait. As soon as the float has revolved sufficiently to completely unwind the anchor line 16, 24, the minnow can swim out of the chamber 10 through the mouth 12, and in doing so, will pull out the bait sinker 15. As the bait sinker descends and pulls the minnow downwardly, the bait line 21 will be unwound until the sinker 15 reaches a depth depending on the length of the bait line used.

In order to operate in this way, it will be understood that the anchor line 16, 24 should be about twice as long as the bait line 21, so that the anchor 23 and line 16, 24 will be at a point beyond the spot where the minnow is held by the sinker 15, after the bait line 21 has been completely unwound. Due to this arrangement, the minnow will be prevented from swimming across the anchor line 16.

When fishing with the current or strong wind, the anchor line 24 and anchor 23 will not be required, and these parts may be removed from the float, as the minnow cannot get out of the bait pocket 10 while casting.

When using small bait other than minnows, the plug or end gate 11 can be pushed into the chamber 10 to limit the size of the latter. At this point it will be noted that the sinker 15 may also be placed in the pocket 25, and in that event the sinker 15 should be set about one and one-half inches from the baited hook before the hook and bait are placed in the pocket 10 and the sinker 15 is placed in the anchor pocket 25. After casting, as soon as the float strikes the water, the sinker 15 will then drop out of the pocket 25, and will pull the bait out of the pocket 10.

From the foregoing it is believed that the construction, operation and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket, and the sinker being insertable into either one of said pockets.

2. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket, and the sinker being insertable into either one of said pockets, said end wall being movably mounted in the float for varying the size of the bait pocket.

3. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket, and the sinker being insertable into either one of said pockets, the portion of the float on which the line is wound being of spool shape.

4. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket, and the sinker being insertable into either one of said pockets, said anchor pocket having a restricted mouth and projecting at its inner end away from the mouth to prevent the sinker from pulling out of the anchor pocket during casting.

5. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket and the sinker being insertable into either one of said pockets, and a swivel connection at one end of the float for use in connecting the same to a casting line.

6. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket and the sinker being insertable into either one of said pockets, and an anchor line wound about the float and having one of its ends secured to the float, and an anchor secured to the other end of the anchor line and occupying the anchor pocket.

7. A self-anchoring bait protecting casting float, comprising a buoyant body provided with a bait pocket and an anchor pocket, the bait pocket having an end wall and a mouth, a bait line adapted to be wound on said body and having one of its ends secured to the body and its other end provided with a hook and a bait sinker, the hooked end of the line being insertable into the bait pocket and the sinker being insertable into either one of said pockets, and an anchor line wound about the float and having one of its ends secured to the float, and an anchor secured to the other end of the anchor line and occupying the anchor pocket, said anchor line closing the mouth of the bait pocket.

8. A self-anchoring bait protecting casting float, comprising an elongated buoyant body provided at one end with a swivel connection for connecting the same to a casting line, a bait pocket and an anchor pocket arranged end to end in the float and having mouths opening through the same side of the float, and a partition in the float arranged between the pockets and restricting the mouth of the anchor pocket and enlarging the mouth of the bait pocket.

9. A casting bait casing comprising an elongated buoyant body provided with a bait pocket and an anchor pocket, said pockets being arranged end to end in the casing and having mouths opening through the same side of the casing, and a partition in the casing arranged between the pockets and restricting the mouth of the anchor pocket and enlarging the mouth of the bait pocket, said bait pocket having a movable plug at one end thereof.

10. A substantially tubular casting bait casing, said casing being provided with closures at the ends thereof, one of said closures being frictionally retained in position, and a partition disposed intermediate the ends of said casing and sub-dividing the latter into a relatively large bait pocket and a relatively small anchor pocket, each of said pockets being provided with a mouth opening through the same side of the casing.

In testimony whereof, I have signed this specification.

WILLIAM A. WALTHERS.